US009920807B2

United States Patent
Borgmeier et al.

(10) Patent No.: US 9,920,807 B2
(45) Date of Patent: Mar. 20, 2018

(54) METHOD FOR REDUCING THE WEIGHT OF A FRICTION LINING CARRIER PLATE

(71) Applicants: TMD Friction Services GmbH, Leverkusen (DE); Dömer GmbH & Co. KG, Lengestadt-Langenei (DE)

(72) Inventors: Olav Borgmeier, Hueckeswagen (DE); Dirk Dresen, Leverkusen (DE); Harald Grzanna, Siegburg (DE); Wolfgang Hogenkamp, Wuppertal (DE); Thomas Kierspel, Bergisch-Gladbach (DE); Armin Muhl, Gummersbach (DE); Willmut Rohling, Ruppichteroth (DE); Dai-Victor Sakaguchi, Gruendau (DE); Roland Steege, Cologne (DE); Jochen Asbeck, Attendorn (DE); Christoph Hahner, Solingen (DE)

(73) Assignees: TMD Friction Services GmbH, Leverkusen (DE); Dömer GmbH & Co. KG, Lengestadt-Langenei (DE)

(*) Notice: Subject to any disclaimer, the term of this patent is extended or adjusted under 35 U.S.C. 154(b) by 0 days.

(21) Appl. No.: 15/149,503

(22) Filed: May 9, 2016

(65) Prior Publication Data
US 2016/0250676 A1 Sep. 1, 2016

Related U.S. Application Data

(63) Continuation of application No. 13/978,606, filed as application No. PCT/EP2012/054082 on Mar. 9, 2012, now abandoned.

(30) Foreign Application Priority Data

Mar. 25, 2011 (DE) .................. 10 2011 001 562

(51) Int. Cl.
*B21D 22/02* (2006.01)
*F16D 69/04* (2006.01)
(Continued)

(52) U.S. Cl.
CPC ......... *F16D 69/0408* (2013.01); *B21D 22/04* (2013.01); *F16D 65/095* (2013.01); *F16D 2069/0441* (2013.01)

(58) Field of Classification Search
CPC ............... F16D 65/095; F16D 69/0408; F16D 2069/0441; F16D 2250/0023; F16D 2200/0021; B21D 22/02; B21D 22/04
See application file for complete search history.

(56) References Cited

U.S. PATENT DOCUMENTS 3,693,764 A    9/1972  Anders
3,862,464 A *  1/1975  Arens .................. A47L 23/24
                                              15/217

(Continued)

FOREIGN PATENT DOCUMENTS

DE    1957751 U    3/1967
DE    1957751 A1   5/1971
(Continued)

OTHER PUBLICATIONS

Japanese Office Action dated Feb. 3, 2015.

*Primary Examiner* — Melody M Burch
(74) *Attorney, Agent, or Firm* — Rogowski Law LLC

(57) ABSTRACT

The invention relates to a friction lining carrier plate (1), which has a metal sheet, to a friction lining, to a friction lining receptacle and to a brake. The metal sheet is formed in such a manner that it has a first and second recess (11, 20) on the friction lining side, wherein the metal sheet has at least a second recess (20) on the friction lining side, wherein the first and second recesses (11, 20) have a differing depth.

(Continued)

The first and second recesses on the friction lining side are each formed as an elevation on the side of the actuation means.

9 Claims, 5 Drawing Sheets

(51) Int. Cl.
 *F16D 65/095* (2006.01)
 *B21D 22/04* (2006.01)

(56) References Cited

U.S. PATENT DOCUMENTS

| | | | |
|---|---|---|---|
| 3,998,300 | A | 12/1976 | Sullivan |
| 5,033,590 | A | 7/1991 | Kobayashi et al. |
| 5,129,487 | A | 7/1992 | Kobayashi et al. |
| 5,355,986 | A | 10/1994 | Biswas |
| 6,267,206 | B1 | 7/2001 | Grimme et al. |
| 6,279,222 | B1 | 8/2001 | Bunker et al. |
| 2002/0125081 | A1 | 9/2002 | Meyer |
| 2004/0140165 | A1 | 7/2004 | Pham |
| 2005/0090139 | A1* | 4/2005 | White ................ H01R 4/2429 439/395 |
| 2006/0278482 | A1* | 12/2006 | Kahan ................ F16D 65/092 188/250 G |
| 2013/0277159 | A1 | 10/2013 | Borgmeier et al. |
| 2013/0277160 | A1 | 10/2013 | Dreher et al. |

FOREIGN PATENT DOCUMENTS

| | | |
|---|---|---|
| DE | 2008057 A1 | 9/1971 |
| DE | 3119894 A1 | 12/1982 |
| DE | 4335001 A1 | 4/1995 |
| DE | 19706123 A1 | 8/1998 |
| DE | 102004051046 A1 | 5/2006 |
| DE | 102009032661 A1 | 8/2010 |
| JP | 2000-097260 A | 4/2000 |
| JP | 2000-104764 A | 4/2000 |
| WO | 0131225 A2 | 5/2001 |
| WO | 2010/123133 A1 | 10/2010 |
| WO | 2010/128133 A1 | 11/2010 |

* cited by examiner

METHOD FOR REDUCING THE WEIGHT OF A FRICTION LINING CARRIER PLATE

CROSS-REFERENCE TO RELATED APPLICATIONS

This application is a continuation of U.S. Ser. No. 13/978,606, filed Jul. 8, 2013 and abandoned Sep. 5, 2016, which was a national stage application (under 35 U.S.C. § 371) of PCT/EP2012/054082, filed Mar. 9, 2012, claiming benefit of German application 10 2011 001 562.0, filed Mar. 25, 2011.

TECHNICAL FIELD AND STATE OF THE ART

The state of the art encompasses differently configured friction lining carrier plates, for example, for disc brakes onto which a friction lining is applied.

Certain prerequisites have to be met whenever new friction lining carrier plates are designed. For instance, the friction lining carrier plate has to be configured in such a way that it is ensured that the friction lining cannot become detached. Moreover, the friction lining carrier plate has to be configured in such a way that it has the same envelope contour as existing friction lining carrier plates, so that the friction lining carrier plate can be installed in existing brake systems.

International patent document WO 2010/128133 discloses a friction lining carrier plate consisting of shaped sheet steel having a uniform thickness. The friction lining carrier plate has a front that faces the friction lining and a rear that faces a brake cylinder. Moreover, the friction lining carrier plate has a depression on the side where the friction lining is located and a web area that extends along the outer edge of the friction lining carrier plate and that extends away from the bottom of the depression in the direction of the rear. The depression of the front is configured so that the friction lining carrier plate is of such a thickness that it can be installed in existing brake systems.

U.S. Pat. Appln. No. 2004/0140165 A1 and German patent document DE 1 957 751 each disclose a friction lining carrier plate with a lining carrier. Numerous depressions are present in the lining carriers. Here, the individual depressions are of different depths. The side of the lining carrier facing the actuation means is configured so as to be flat.

German utility model DE 71 33 858 U, German patent application DE 195 07 916 A1, German patent application DE 10 2009 032 661 A1, international patent application WO 01/31 225 A2, German patent application DE 197 06 123 A1, German patent application DE 10 2004 051 046 A1 and international patent application WO 2010/123 133 A1 each disclose a friction lining carrier plate. The friction lining carrier plate has a lining carrier in which numerous depressions are formed, whereby all of the depressions are of the same depth. On the side where the actuation means is located, the depressions are configured as elevations.

One drawback of the known friction lining carrier plates is that the sheet steel is thick, as a consequence of which the friction lining carrier plate is very heavy.

It is an objective of the present invention to avoid the above-mentioned drawbacks.

SUMMARY OF THE INVENTION

According to an embodiment of the invention, a friction lining carrier plate is provided which comprises a metal sheet. The metal sheet is shaped in such a way that it has a first depression and at least a second depression on the side where the friction lining is located. The first and second depressions are configured in such a way that they are of different depths.

As set forth in this application, the term "depression" refers to an area of the friction lining carrier plate that is lowered relative to another area of the friction lining carrier plate. The depression can be created, for example, by means of embossing of the friction lining carrier plate. The first and second depressions are created in that a compressive force is applied to the front of the friction lining carrier plate facing the friction lining. The compressive force is oriented in the direction away from the friction lining or in the direction towards an actuation means. On the side where the actuation means is located, the first and second depressions are formed as elevations. The front of the friction lining carrier plate refers to the side facing the friction lining. The rear of the friction lining carrier plate refers to the side facing away from the friction lining.

Advantageously, the friction lining carrier plate is shaped in such a way that providing a first and a second depression can ensure that the requisite envelope contour is retained, even when a thin friction lining carrier plate is used. In this manner, such a shaping procedure ensures that the friction lining carrier plate is of such a thickness that it can be installed in an existing brake system. Thus, for instance, the thickness of 9 mm, which is required for the friction lining carrier plate by the geometry of the brake system, can be achieved by the shaping according to this embodiment of the invention, for instance, a 5 mm-thick friction lining carrier plate. This ensures that the friction lining carrier plate can be installed in existing brake systems. The use of a thin friction lining carrier plate such as, for example, a 5 mm-thick metal sheet, entails the advantage that the weight of the friction lining carrier plate is reduced. Another advantage consists of the fact that the volume of material to be disposed of during the production of the friction lining carrier plate is diminished since the friction lining carrier plate is thinner.

The "thickness" of the friction lining carrier plate refers to the distance between the side facing the friction lining and the side facing the actuation means.

Another advantage of the invention lies in the fact that the use of at least two depressions of different depths can reduce the amount of friction lining used in comparison to a friction lining carrier plate that only has one single depression, provided that the thickness of the two friction lining carrier plates is the same. The reason for this is that the first and second depressions have different depths. The depth of the first depression is less than that of the second depression or vice versa. As a result, less friction lining material is needed since, due to the smaller depth of the first depression, less friction lining material is needed in order to fill the first and second depressions than would be the case if a friction lining carrier plate were provided with only one depression having a constant depth. As a result, friction material on the front of the friction lining carrier plate is displaced by the depressions created by shaping on the rear of the friction lining carrier. Consequently, the total weight of the friction lining is reduced. In addition, due to the depressions that have been thus created, the friction lining carrier plate acquires greater flexural and torsional stiffness. Moreover, the use of a friction lining carrier plate made of a thinner material translates into a smaller installation volume while the wearing volume remains the same. The friction lining material and/or an interlayer can be applied onto the friction lining carrier plate, for example, by means of an adhesive.

The friction lining carrier plate for the second depression can be embossed at those places of the friction lining carrier plate that, on the side where the actuation means is located, can be brought into contact with other parts such as, for instance, a brake piston. In this context, the embossing of the friction lining carrier plate is carried out in such a way that the second depression is of such a depth on the side where the friction lining is located or has such a high second elevation on the side where the actuation means is located that it is ensured that, for example, the actuation means can come into contact with the second elevation during the braking process.

In a preferred embodiment of the invention, a material having a lower thermal conductivity than that of the friction lining can be placed into the first and/or second depression. This reduces the heat conveyed to the actuation means during the braking process, as a result of which the risk of damage to the actuation means is lowered.

Thanks to the fact that the first and second depressions have been provided, the local thickness of the friction lining that is placed into the first and second depressions can be set. Thus, at the places where the friction lining has been installed in the first and second depressions, the friction lining is thicker than at the places where it has only been installed in the first depression, or else, on the side where the friction lining carrier plate is located, the friction lining has first and second elevations that penetrate into the first and second depressions when the friction lining is in its installed state. In this context, the first and second elevations are configured in such a manner that they extend to different extents in the direction of the friction lining carrier plate.

Due to the local thickness of the friction lining or due to the different extensions of the first and second elevations, an adjustable spring effect, and thus flexibility of the friction lining, can be achieved. By setting the local thickness of the friction lining, it can be achieved that the tendency towards crack formation of the friction lining is reduced since the brake lining has a greater overall flexibility. Furthermore, a more uniform introduction of heat into a brake disc and/or friction lining carrier plate can be achieved due to the better contact of the friction lining with the brake disc. This reduces the tendency towards crack formation of the brake disc. Owing to the adjustable spring effect of the friction lining, greater damping, especially greater local damping, can be achieved during a braking process. This brings about a noise reduction during the braking process. Moreover, by setting the local thicknesses, it is possible to systematically set the compressibility of the friction lining by means of the thickness of the friction lining. In other words, the friction lining can be set so as to be harder. Setting the compressibility by means of the thickness of the friction lining translates into greater comfort since there are fewer changes in the compressibility over the service life of the friction lining. In addition the second depression can be provided at those places of the friction lining carrier plate where it is needed in order to set the local thickness of the friction lining.

Another advantage of providing a friction lining with different thicknesses, or else with first and second elevations, consists of the fact that, while the installation volume and the wearing volume remain the same, the friction lining has a smaller mass than friction linings that are of the same thickness or only have one elevation.

The second depression can have different shapes. For instance, when seen from the front of the friction lining carrier plate, it can be circular or polygonal, especially rectangular. The width of the second depression can be constant or can vary. The sides of the polygon can run differently and can have different widths. For example, the sides can be straight or curved, or else they have another shape.

The term "width" refers to the distance in the front or rear between the opposing walls that delimit the depression.

The friction lining carrier plate can be a stamped metal sheet having a thickness of 1 mm to 15 mm, especially 5 mm. The friction lining carrier plate can be made of S355MC steel. Of course, the friction lining carrier plate can be made of another type of steel that can be processed by shaping. The friction lining carrier plate can have a constant or uniform thickness. The thickness of the friction lining carrier plate remains essentially or substantially uniform, even after the shaping process, whereby slight fluctuations in the thickness are due only to the shaping of the friction lining carrier plate which had originally had a uniform thickness.

The friction lining carrier plate can be embossed in such a way that, on its side where the friction lining is located, it forms an encircling web on the edge of the friction lining carrier plate protruding from the first or second depression in the direction away from the rear of the friction lining carrier plate. This web ensures that the shearing forces that act upon the friction lining during the braking process do not cause the friction lining to become detached from the friction lining carrier plate. The web can be configured in such a manner that it has interruptions. The term "interruptions" refers to sections at the edge of the friction lining carrier plate that have not been embossed.

In a preferred embodiment, at least one contact means can be installed in the friction lining carrier plate on the side where the actuation means is located or on the side where the friction lining is located. The contact means can be installed on the edge of the friction lining carrier plate on the side where the actuation means and/or the friction lining are located. The contact means can be installed on the friction lining carrier plate by means of welding. It is likewise possible to rivet the contact means or to shape it into through-holes or blind holes of the carrier plate. As an alternative, the possibility also exists to shape the contact means in one piece onto the brake carrier plate. In this context, the brake carrier plate is shaped in such a way that the shaped contact means can be configured so as to be perpendicular or essentially perpendicular to the brake carrier plate. The contact means increases the strength of the carrier plate and can be employed to secure the friction lining carrier plate to a base of the brake system. This ensures that the friction lining carrier plate cannot become detached from the brake system when the friction lining is almost completely worn out. Alternatively, the contact means can also be installed on the base of a brake system instead of on the lining carrier plate.

The friction lining carrier plate can be shaped on the side where the actuation means is located in such a way that a projection is formed on the side where the friction lining is located and it penetrates into the friction lining in the installed state of the friction lining carrier plate and of the friction lining. The projection can have a knob-like configuration and it extends from the bottom of the first and/or second depression(s) in the direction away from the rear of the friction lining carrier plate. On its end facing the friction lining, the projection can have a recess that can be symmetrical to the center axis of the projection. In addition or as an alternative to the recess, the projection can also have an undercut along its circumference. Thus, the undercut can be situated between the bottom of the first and/or second depression(s) and the circumference of the projection. Such a configuration of the projection achieves not only a fixation by means of the web but also an additional fixation of the friction lining to the friction lining carrier plate.

Moreover, in one advantageous embodiment, at least one stiffening means is provided at least in certain areas in the first and/or second depression(s) and/or undercut. The stiffening means can be, for instance, a metal grid or a metal sheet. In this context, the stiffening means is affixed, for example, to the friction lining carrier plate through the friction lining. When the actuation means exerts a pressure load onto the friction lining, the stiffening means functions like a tie rod through the actuation means, as a result of which the stiffening of the friction lining is increased.

A friction lining carrier plate having a thickness of, for example, 5 mm, can be shaped in such a way that the first depression, starting from an end of the web facing the friction lining is lowered, for example, by 0.5 mm to 5 mm, especially 2.5 mm. Starting at the bottom of the first depression, the second depression can be lowered, for instance, by 1 mm to 5 mm, especially 1.5 mm. The depressions are configured in such a way that the distance between the end of the web facing the friction lining and the end of the elevation facing the second actuation means—corresponding to the second depression on the friction side—does not exceed a defined thickness, especially 15 mm. On the side where the friction lining is located, the projection can extend from the bottom of the first and/or second depression by 1 mm to 5 mm away from the bottom of the first or second depression in the direction of the friction lining, whereby the end of the projection facing the friction lining can be flush or not flush with the end of the web facing the friction lining.

The first and second depressions can be configured in such a manner that the bottom surface area of the first depression makes up 1% to 90% and the bottom surface area of the second depression makes up 1% to 90% of the total surface area of the friction lining carrier plate. Such a configuration of the bottom surface of the first and second depressions ensures that very little friction lining is used. Moreover, at the same time, it is ensured that the actuation means can be put into contact with the first and/or second elevation(s) on the side where the actuation means is located, corresponding to the first and/or second depression(s) on the side where the friction lining is located, or else, the properties of the friction lining can be positively influenced by setting the local thicknesses of the friction lining in the manner described above.

In one advantageous embodiment of the invention, the brake carrier plate can be provided with a wear indicator for determining the wear of the friction lining. In a simple manner, the wear indicator can ascertain wear of the friction lining so that, in the final analysis, damage to a brake disc or to the brake carrier plate caused by direct contact of the brake disc with the brake carrier plate can be prevented.

As set forth in the invention, the term "brake lining" refers to the component that is formed when the friction lining according to the invention is installed in the friction lining carrier plate according to the invention. In one preferred embodiment, the brake lining can be provided in a brake system. To put it more precisely, two brake linings can be provided in a brake system, whereby the two brake linings are arranged on opposite sides of the brake disc. During a braking process, the appertaining friction lining of the brake lining is pressed against the brake disc.

The brake discs are accommodated in a brake lining holder. The brake lining as well as the brake lining holder can be moved axially towards or away from the brake disc. The brake system has the advantage that it can be constructed so as to be small and lightweight, since the smaller and lighter friction lining carrier plate or the friction lining according to the invention can be used in the brake system. The contact means for securing the brake lining can be provided in the brake lining holder.

Additional objectives, features and advantageous application possibilities of the present invention ensue from the description below of an embodiment with reference to the drawings. In this context, all of the described and/or depicted features, either on their own or in any meaningful combination, constitute the subject matter of the present invention, also irrespective of their compilation in the claims to which they refer back.

DESCRIPTION OF THE DRAWINGS

The following is shown in this context.

DETAILED DESCRIPTION OF EMBODIMENTS

Figure 1:
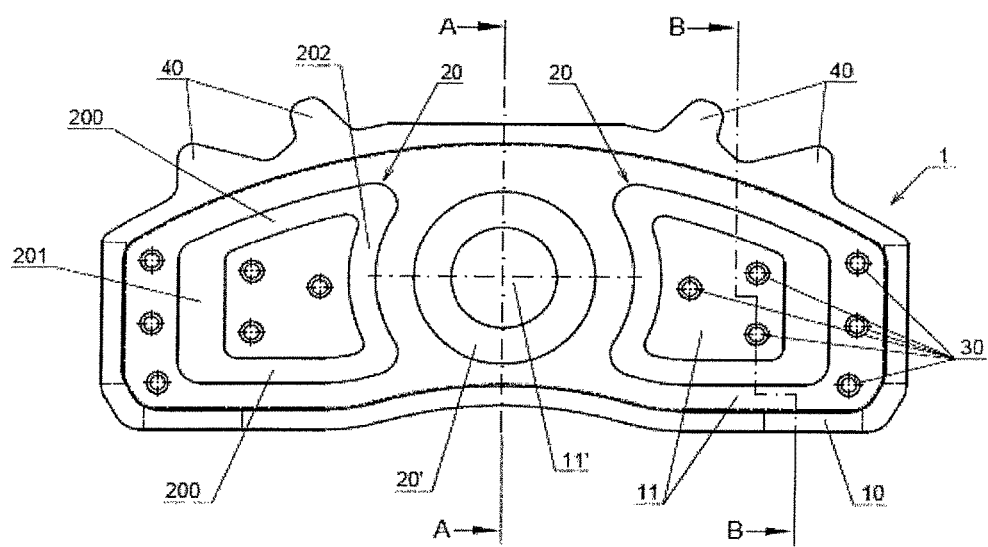
FIG. 1 is a friction lining carrier plate according to the invention, in a view of the front facing the friction lining.

The friction lining carrier plate 1 shown in FIG. 1 has several fastening means 40 for fastening the friction lining carrier plate 1 to a brake system (not shown here). Moreover, on the side where the friction lining 302 (shown in FIG. 5) is located, the friction lining carrier plate 1 has a web 10 that runs along the edge of the friction lining carrier plate, a first depression 11 and two differently configured depressions 20, 20'. The web 10 extends from the first depression 11 in the direction away from the rear of the friction lining carrier plate 1. Moreover, the friction lining carrier plate 1 has several projections 30 which extend from the bottom of the first depression 11 in the direction away from the rear of the friction lining carrier plate 1.

A second depression 20' is configured so as to be circular and it surrounds a circular first depression 11'. The width of the second circular depression 20 is constant and preferably amounts to 10 mm. The circular second depression 20' is arranged between two identically shaped second depressions 20, each of which is rectangular in shape. The individual sides 200, 201, 202 of the two identically shaped second depressions 20 are of different widths. For instance, the sides 200, 202 of the appertaining second depression 20 have the same width of preferably 7 mm, while the side 201 has a width of preferably 12 mm. Furthermore, three of the four sides of the second depression 20, which are joined together, are configured as straight lines while the side 202 is curved. The two straight sides 200 that are opposite from each other do not run parallel to each other.

Figure 2:
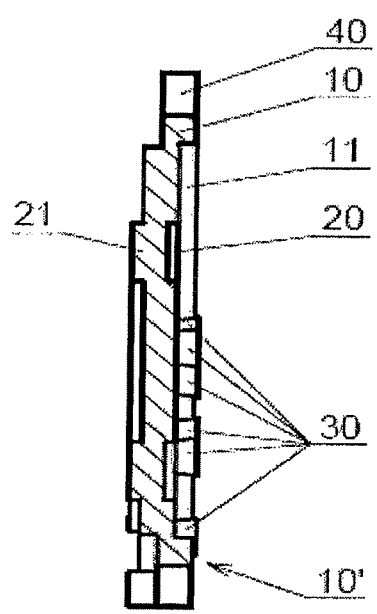
FIG. 2 is a cross-sectional side view of the friction lining carrier plate according to the invention, along the section A-A from FIG. 1.

FIG. 2 shows a side view in cross section of the friction lining carrier plate 1 along a section A-A from FIG. 1. As can be seen in FIG. 2, an end of the fastening means 40 facing the friction lining is flush with an end 10' of the web 10. The friction lining carrier plate 1 is shaped in such a way that the first depression 11 is formed on the side where the friction lining is located. The first depression 11 is lowered relative to the end 10' of the web 10 facing the friction lining. In order to form the first depression 11, on the side where the friction lining is located, a compressive force is exerted onto the front of the friction lining carrier plate 1 in the direction of the rear of the friction lining carrier plate 1 during the shaping procedure.

Another compressive force is exerted onto the bottom of the first depression 11 in the direction of the rear of the friction lining carrier plate 1, so that the second depression 20' that is lowered towards the bottom of the first depression 11 is formed. The second depression 20' (FIG. 1) that is formed on the side where the friction lining is located constitutes a second elevation 21 (FIG. 2) on the side where the actuation means is located. During a braking process, the second elevation 21 is put into contact with an actuation means (not shown in the figures).

Figure 3:
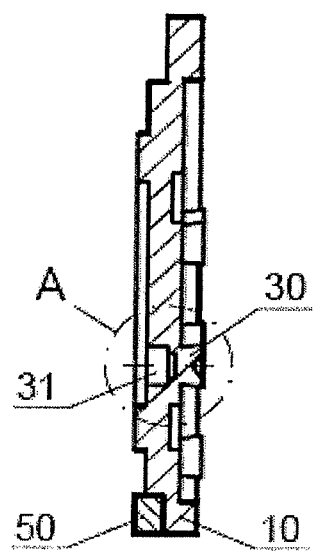
FIG. 3 is a cross-sectional side view of the friction lining carrier plate according to the invention, along the section B-B from FIG. 1.

FIG. 3 shows a side view in cross section of the friction lining carrier plate 1 along the section B-B from FIG. 1. The projections 30 protrude from the bottom of the first depression 11 in the direction away from the rear of the brake carrier plate in such a way that their ends are not adjoined flush with the end 10' of the web 10. For purposes of forming the projections 30, on the side where the actuation means is located, a compressive force is exerted onto the rear of the friction lining carrier plate 1 in the direction of the friction lining. Owing to the compressive force, rear depressions 31 that correspond to the projections 30 on the side where the friction lining is located are formed on the side where the actuation means is located.

A contact means 50 is joined to a section of the edge of the friction lining carrier plate on the side where the actuation means is located, said edge corresponding to the web on the side where the friction lining is located. The contact means 50 is joined by welding to the edge of the friction lining carrier plate on the side where the actuation means is located.

Figure 4:
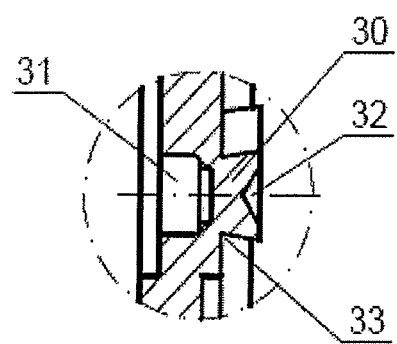
FIG. 4 is an enlarged depiction of the area A from FIG. 3.

FIG. 4 shows an enlarged depiction of the projection from FIG. 3. The projection 30 is configured in such a way that, on its end facing the friction lining, it has a recess 32. The recess 32 is configured so as to be symmetrical to the center axis (not shown here) of the projection. On the side where the friction lining is located, the projection 30 extends from the first depression 11 in such a way that an undercut 33 is formed between the circumference of the projection 30 and the bottom of the first depression 11.

Figure 5:
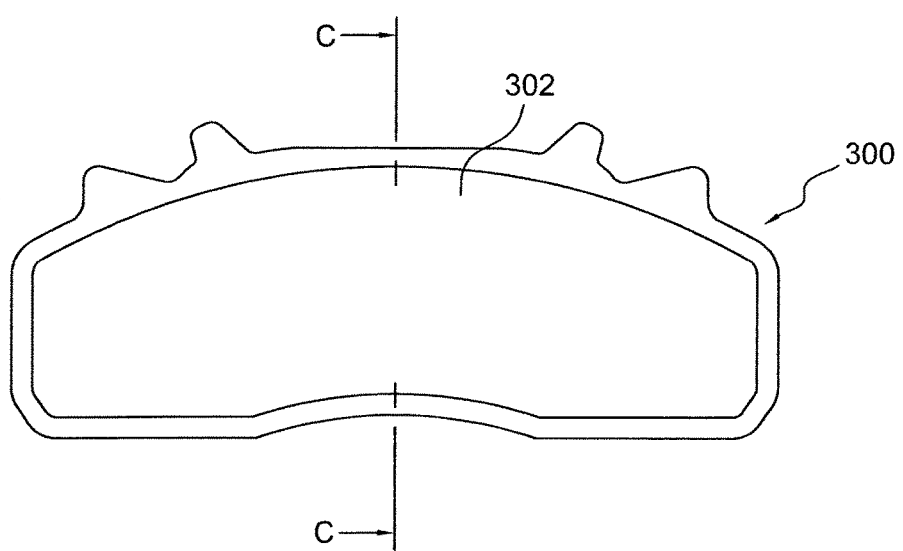
FIG. 5 is a front view of a friction lining carrier plate and attached friction lining.

FIG. 5 shows a brake lining 300 with a friction lining 302 installed in the friction lining carrier plate 1 of the embodiment shown in FIGS. 1 and 2.

The invention was described in conjunction with one or more special embodiments. It goes without saying, however, that changes and modifications can be undertaken without departing from the protective scope of the claims below.

LIST OF REFERENCE NUMERALS 1 friction lining carrier plate
10 web
10' end
11 first depression
11' first circular depression
20 second depression
20' second circular depression
21 first elevation
30 projection
31 rear depression
32 recess
33 undercut
40 fastening means
50 contact means
200 straight side
201 straight side
202 curved side
300 brake lining
302 friction lining

The invention claimed is:

1. A method for reducing the weight of a friction lining carrier plate for a brake system, comprising:
providing a metal sheet having a front side and a reverse side and having a substantially constant first thickness between said front side and reverse side, said first thickness being thinner than a specified thickness dimension for the friction lining carrier plate in the brake system;
shaping the metal sheet by embossing or stamping to form therein a first depression on the front side, said first depression defining an edge, and at least one second depression on the front side, said metal sheet having a web surrounding the first depression at the edge on the front side which web is not shaped by embossing or stamping, wherein the first depression and the at least one second depression are of different depths, and correspond with elevations on the reverse side, and wherein at least a portion of the front side is not depressed, wherein the shaped metal sheet has a second thickness as measured between the non-depressed front side portion and the reverse side elevation corresponding to the second depression that is thicker than the first thickness, with said front side adapted for contact with a friction lining and said reverse side adapted for contact with brake actuation means; and
securing a friction lining to the shaped front side.

2. The method of claim 1, further comprising shaping the metal sheet by embossing or stamping to form at least one projection that extends upwardly on the front side from a bottom surface of the first or second depressions.

3. The method of claim 2, further comprising shaping the metal sheet by embossing or stamping to form at least one undercut on the circumference of the at least one projection.

4. The method of claim 3, wherein the at least one undercut is formed between the bottom of the first or second depressions and the circumference of the at least one projection.

5. The method of claim 3, further comprising installing at least one stiffening means in the at least one undercut.

6. The method of claim 1, wherein the second thickness is substantially the same as the specified thickness dimension for the friction lining carrier plate.

7. The method of claim 1, wherein the first thickness is in the range of 1 mm to 15 mm.

8. The method of claim 1, wherein the second thickness is in the range of 9 mm to 15 mm.

9. The method of claim 4, wherein the first and second depressions, corresponding elevations, at least one projection and at least one undercut on the circumference of the at least one projection are formed in a single embossing or stamping of the metal sheet.

* * * * *